United States Patent [19]

Moorhouse et al.

[11] 4,448,386

[45] May 15, 1984

[54] LOW PROFILE RESILIENT SUSPENSION FOR VEHICLE SEAT

[75] Inventors: David Moorhouse, Towcester; David E. Marshall, Bugbrooke, both of England

[73] Assignee: UOP Inc., Des Plaines, Ill.

[21] Appl. No.: 326,300

[22] Filed: Dec. 1, 1981

[51] Int. Cl.[3] .............................................. B60N 1/02
[52] U.S. Cl. .................................... 248/564; 248/577
[58] Field of Search ............... 248/564, 577, 576, 588, 248/584, 592

[56] References Cited

U.S. PATENT DOCUMENTS

| | | | |
|---|---|---|---|
| 3,109,621 | 11/1963 | Simons | 248/564 |
| 3,572,624 | 3/1971 | Holelampf | 248/564 |
| 4,382,573 | 5/1983 | Aondetto | 248/564 |

FOREIGN PATENT DOCUMENTS

| | | |
|---|---|---|
| 1230734 | 12/1968 | United Kingdom . |
| 1491291 | 9/1974 | United Kingdom . |
| 1521316 | 9/1974 | United Kingdom . |

*Primary Examiner*—Ramon S. Britts
*Assistant Examiner*—Alvin Chin-Shue
*Attorney, Agent, or Firm*—James R. Hoatson, Jr.; Barry L. Clark; William H. Page, II

[57] ABSTRACT

Low profile resilient suspension utilizes a pair of horizontally positioned, adjustably tensioned springs to support the weight of a seat occupant. The springs are mounted to one of the movable or fixed seat frame members so as to be completely independent of the linkages, such as scissors links, which guide the movable seat frame member for generally vertical parallel movement relative to the base frame member and floor. The tension of the springs can be adjusted by weight adjustment control members fixed to one of their ends to accommodate occupants of differing weights. The adjustment can be made when the seat is either occupied or unoccupied. The weight adjustment control members remain fixed relative to the seat frame as the suspension oscillates vertically. The opposite ends of the springs are mounted to the ends of the short arms on a pair of connected bellcrank levers which are pivoted to one of the seat frame members. The long arms of the bellcrank levers have a predetermined cam shape along one edge that engages a cam follower that is fixed during operation relative to the other of the seat frame members. The cam is shaped to provide any desired load deflection characteristic for the suspension seat and preferably either a straight line characteristic or one in which the springs would offer greater resistance to bottoming of the suspension at the end of its ride stroke. In a preferred embodiment, a height adjustment mechanism is provided for moving the movable seat frame and cam follower to a plurality of selected vertical positions which each permit the suspension to move within its entire "ride zone."

10 Claims, 3 Drawing Figures

LOW PROFILE RESILIENT SUSPENSION FOR VEHICLE SEAT

BACKGROUND OF THE INVENTION

The invention relates to resilient seat suspensions and especially to suspensions of the type which utilize horizontally mounted tension springs to achieve a seat suspension having a relatively low profile. Examples of such suspensions are described in U.K. Pat. Nos. 1,230,734, 1,491,291 and 1,521,316. U.K. Pat. No. 1,230,734 is an example of a suspension where the spring acts directly on the parallel movement linkage and is mounted to it in such a manner that the spring offers less and less resistance as the linkage reaches the bottom of its stroke. The U.K. Pat. No. 1,521,316 shows a suspension which can be independent of the parallel motion linkage but could not use a specially shaped cam surface to control the spring deflection characteristics since the cam follower has varying positions relative to the cam surface corresponding to different weight adjustments. U.K. Pat. No. 1,491,291 has a cam lever which can be shaped to control the spring deflection characteristic, but the spring load must be transmitted through the parallel movement linkage and the cam shape would have to be changed if the length of one of the scissors links were to be changed. In the latter design, the springs are connected to a threaded shaft which protrudes from the front of the seat base frame and moves continually fore and aft as the suspension moves vertically. This movement would seem to present a possibility for finger pinching as would the low position of the shaft handle relative to the vehicle floor. A height adjustment mechanism is provided, but causes some loss of ride stroke at the highest positions of adjustment.

SUMMARY OF THE INVENTION

It is among the objects of the present invention to provide a resilient suspension structure which will permit a large range of vertical isolation movement to take place while consuming a minimum of vertical space when the suspension is collapsed to its lowest position. It is another object to provide a suspension which is mounted on the seat frame members independently of the parallel motion linkage and which has a weight adjustment means for the springs which is stationary relative to its mounting frame during operation of the suspension and which can be adjusted with the occupant either on or off of the seat. An additional object is to provide a suspension which may have any desired deflection characteristic for its spring by shaping a cam lever. Thus, an optimum ride can be provided over the entire "ride zone," and for any weight of occupant.

The foregoing and other objects and advantages are achieved by the present invention which is generally described in the Abstract.

DESCRIPTION OF THE PREFERRED EMBODIMENT

Figure 1:
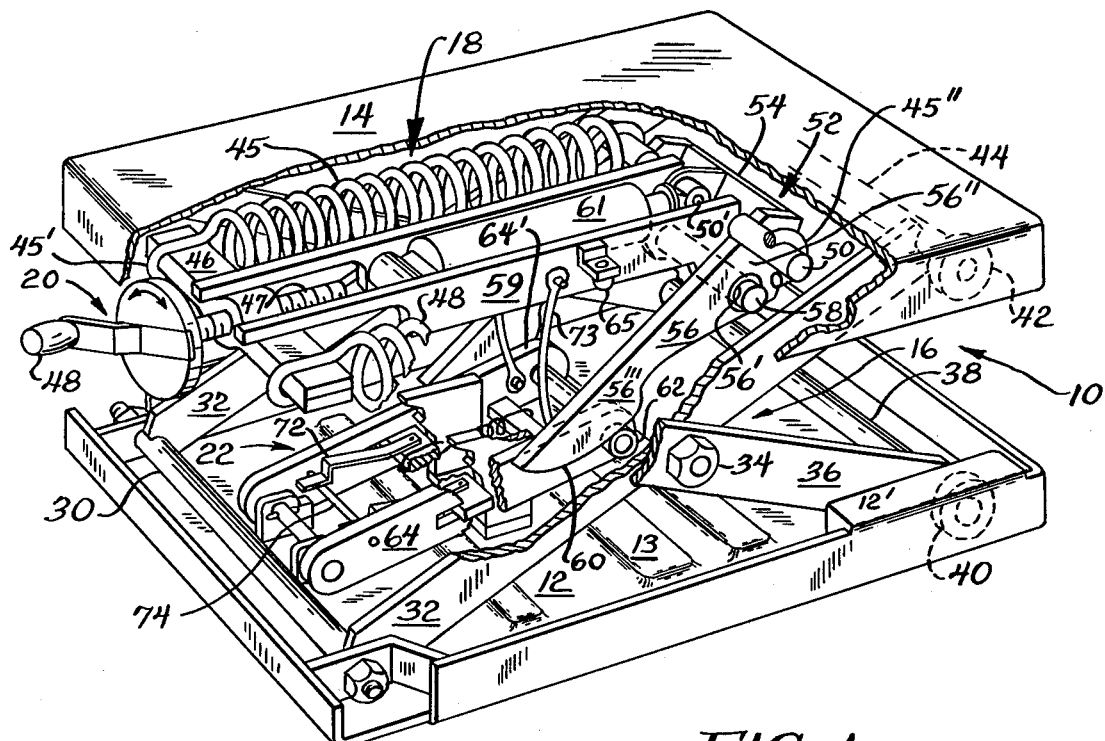
FIG. 1 is a perspective view, partially broken away, and partially in section, showing our improved suspension in cooperation with a height adjustment mechanism.
Figure 2:
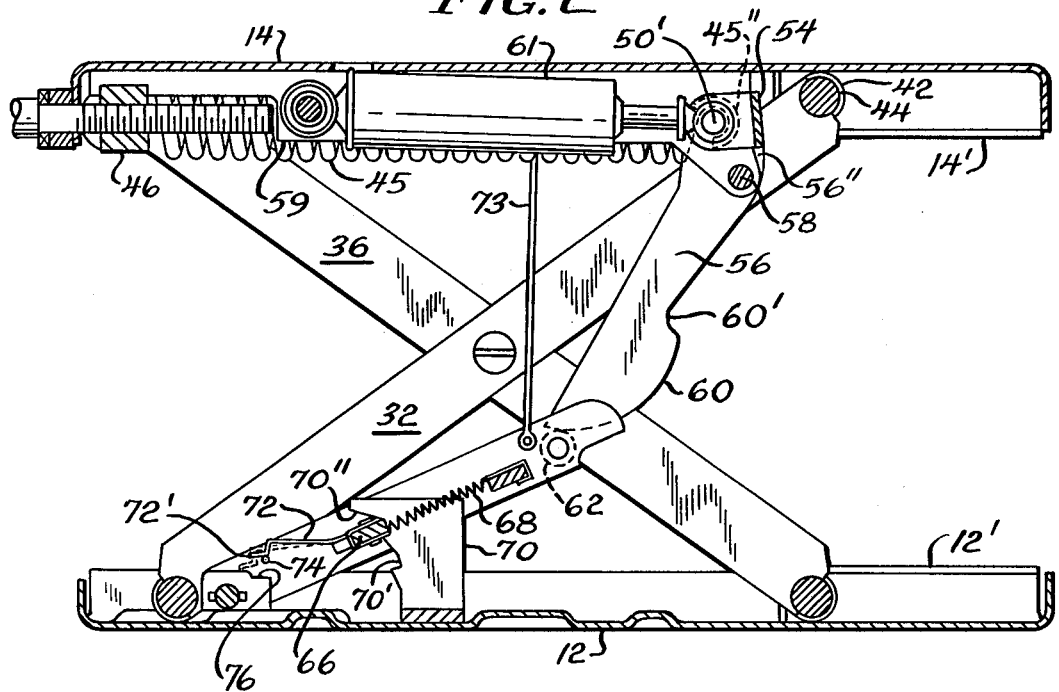
FIG. 2 is a side sectional view showing the suspension at the top of its ride stroke and in its uppermost position of height adjustment.
Figure 3:
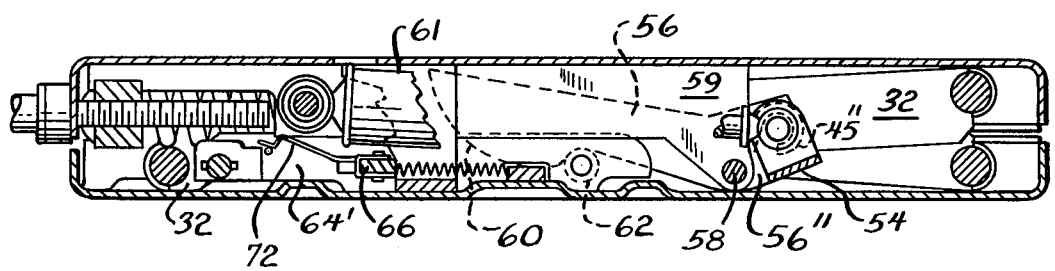
FIG. 3 is a side sectional view showing the suspension at the bottom of its ride stroke and in its lowest position of height adjustment.

Referring to FIG. 1, the improved seat suspension assembly is indicated generally at 10 and can be seen to comprise a base support plate 12 which may include integral strengthening ribs 13, and which is adapted to be fastened by fastening means such as bolts (not shown) to the floor of a vehicle. An upper support plate 14 is adapted to be attached to the base or frame of a seat member (not shown) and is vertically movable relative to the base support 12 in a generally parallel mode by a linkage indicated generally at 16. The upper support 14 is resiliently supported for movement in a predetermined ride zone range relative to the base support 12 by a spring support mechanism 18. The tension of the spring suspension 18 is varied to accommodate occupants of differing weights by a weight adjustment mechanism indicated generally at 20. The height adjustment mechanism indicated generally at 22 determines the bottom point of the movement range or "ride zone" of the upper support 14 relative to the base support 12. To provide a full "ride zone" range of about 100 mm, irrespective of the position of the height adjustment mechanism 22, the parallel movement linkage 16 must accommodate a total vertical movement equal to the sum of the "ride zone" range and the height adjustment range, as illustrated in FIG. 2. For a height adjustment range of 60 mm, this movement would thus be about 160 mm. The parallel linkage 16 also should be completely collapsible, as illustrated in FIG. 3, so that the upper support plate 14 can be brought down to touch the base support plate 12. In the embodiment shown, the collapsed height is only about 55 mm.

Having generally described the structure of the suspension assembly 10, a detailed description follows.

The base support plate 12 has a pivot shaft 30 mounted at its forward end for supporting the lower forward ends of a pair of scissors link members 32. The links 32 are each pivotally mounted at their centers by bolts 34 to a second pair of scissors links 36 which are pivotally mounted to the upper plate 14 at their upper, forward ends. The lower ends of the scissors links 36 are joined together by a shaft 38 which carries a pair of rollers 40 at its ends. The rollers 40 are guided for fore and aft movement between the bottom of support plate 12 and a bent-over flange portion 12'. Similarly, rollers 42, which are on the ends of a shaft 44 connecting the upper ends of links 32, are guided for fore and aft movement between the upper support plate 14 and a bent-over flange portion 14'. The length of the links 32, 36 and the travel path length of the rollers 40, 42 is selected to provide sufficient vertical movement to accommodate the complete desired ride zone range when the height adjustment means 22 is at its uppermost position.

The spring suspension mechanism 18 basically comprises a pair of tension springs 45 which have their forward ends 45' wrapped around a tensioning bar 46 which is internally threaded and engaged with an adjusting screw 47 for preloading the springs when the handle 48 is turned to move the bar 46 forwardly. The screw 47 is mounted for rotation in an aperture (not shown) in the front wall of the support plate 14 but is prevented from moving axially relative to the support plate 14. Since the bar 46 and screw 47 do not move during operation of the suspension, it is obvious that an indicator means (not shown) showing the relative movement of the bar relative to the front wall of the support plate 14 can be calibrated so that the springs 45 can be accurately preloaded to any desired load. Thus, an occupant can adjust the preload to any desired value when he is either in or out of the seat. When the operator adjusts the spring preload to accommodate his correct weight, the springs 45 will extend sufficiently when he sits on the seat to position the suspension 18 in the center of its "ride zone". The rearward ends 45″ of the springs 45 are wrapped around a pair of studs 50 welded onto the cam lever bracket and arm assembly 52. A cross-bar 54 is welded or otherwise joined to a pair of bellcrank cam lever arms 56. The arms 56 each have apertures 56′ which receive a pivot shaft 58 carried by elongated support bar members 59 which are welded or otherwise fixed to support plate 14. The shorter portions 56″ of the bellcrank levers 56 located between the pivot shaft 58 and the studs 50 comprise the short arms of the bellcranks 56 while the longer portions 56‴ between the pivot shaft 58 and the cam surface 60 comprise the long arms of the bellcranks. The cam surface 60 is adapted to be engaged by a cam follower member 62, preferably a roller which has its axis fixedly positioned relative to the base 12 during operation of the seat. The cam follower member 62 would be fixedly mounted on the base 12 when height adjustment of the suspension is not required. However, where height adjustment is to be provided, the cam follower member 62 is mounted at the vertically movable ends of the pivot arms 64 of the height adjustment mechanism 22. It will be readily obvious that vertical movement of the suspension 10, as permitted by the scissors linkage 16, will cause the cam surface 60 to ride along the cam follower roller 62. This movement will cause the long bellcrank arm 56‴ to pivot about shaft 58 and will simultaneously cause the short bellcrank arm 56″ to pivot about the shaft 58. When a weight is applied to the upper support plate 14, such as by an occupant sitting down, the linkage 16 will be compressed downwardly. This movement will cause the bellcrank lever 56 to move clockwise as seen in FIG. 1 so as to increasingly tension the springs 45. If the cam surface 60 was straight, the spring rate of extension would become less and less as the linkage 16 collapsed since the horizontal movement component of the stud 50 decreases as the short arm 56″ becomes more horizontal. Such a situation would result in a poor ride. By shaping the cam surface 60 to cause equal increments of spring expansion for equal increments of vertical movement of the upper support plate 14, the suspension 18 will provide excellent vibration isolation for any weight of occupant throughout the entire height of the "ride zone." The isolation is enhanced by the provision of a damper 61 mounted between the support bars 59 and a stud 50′ which is substantially coaxial with studs 50 and mounted to the same cross-bar 54. Thus, the extension of the springs and damper will be substantially identical as the suspension moves within its entire range.

By providing a predetermined convex shape to the cam surface 60, the effective spring rate of the suspension can be made to remain constant throughout the ride zone. The shape can be readily determined on a computer. It can also be plotted, for example, by assuming that nine equal increments of extension of spring 45 correspond to ten discrete angular positions of stud member 50 on the short arm portion 56″ of the bellcrank about the pivot shaft 58 carried by the upper frame 14 as the seat is compressed in nine equal increments between its uppermost and lowermost positions in its ride zone. Obviously, the long arm portion 56‴ must move to the same ten discrete angular positions as the short arm portion 56″ which is integral with it. It is thus a simple matter to shape the cam surface 60 so that a portion of it will be in contact with the roller 62 as the seat is incrementally compressed, the spring incrementally expanded, and the bellcrank 56 angularly rotated into each of the ten aforementioned positions. It can be seen in the drawings that the cam surface 60 changes direction rather abruptly at its end portion 60′. This is the portion which engages the cam follower roller 62 at the bottom end of the ride stroke, as illustrated in FIG. 3. The reason for the abrupt change is that the point of tangential contact between the spring end 45″ and the stud member 50 moves more horizontally than vertically for each increment of seat compression and spring expansion when the seat is in the upper portion of the ride zone, as illustrated in FIG. 2. Conversely, as the seat is compressed toward the bottom of the ride zone as illustrated in FIG. 3, the aforementioned point of contact must move much further vertically per increment of seat compression in order to cause the amount of horizontal movement necessary to produce said increment of spring expansion.

As previously discussed, the height adjustment mechanism 22 determines the bottom end of the "ride zone" of the suspension. Specifically, elastomeric bumper members 65 carried by support bars 59 will engage the outer upper ends 64′ of the arms 64. If no height adjustment is required, or if it is preferred to provide a separate mechanism between the suspension upper plate 14 and the seat cushion (not shown), or between the base plate 12 and the vehicle floor (not shown), the roller cam follower element 62 could be fixedly mounted on the base plate 12 and the bumper 65 could be located so as to contact the base 12. However, as shown, the cam follower 62 is mounted on the end of arms 64 so that it can be selectively positioned in three positions. A slidable pawl 66 carried by the arms 64 is biased by spring 68 into contact with one of three steps 70′ on a ratchet member 70 which is welded or otherwise affixed to the base plate 12. Actuation of the height adjustment mechanism 22 can be accomplished by providing flexible connecting means 73 of a material such as polypropylene between the arms 64 and the support bars 59. When the seat upper frame 14 is lifted to the top of its stroke, as shown in FIG. 3, continued lifting with the connectors 73 taut will lift the arms 64 and cause the pawl 66 to be moved outwardly along the angled ramp surface 70″ against the force of return spring 68. An angled spring finger extension member 72 will move outwardly with the pawl 66 as it rides along the surface 70″ and when the member 72 reaches the dotted line position shown in FIG. 2, it will snap down over a rod 74 and hold the pawl away from the ratchet steps 70′. At this point, a release of the lifting force being applied to the seat will permit the pawl 66 and arms 64 to drop to their lowest position which is shown in FIG. 3. Shortly before this lowest position is reached, the end portion 72′ of the spring member 72 will engage the stop surface 76. Continued downward movement of the arm 64 will then release the spring member from engagement with rod 74 and permit the pawl to snap into engagement with the lowest of the ratchet steps 70′.

When the seat is to be occupied by one operator after having been adjusted for another, it would be preferable for the operator to initially turn the handle 48 so as to rotate the threaded shaft 47 in a direction to cause the tensioning bar 46 to either increase or decrease the tension in springs 45, whichever is necessary to provide the proper preload to cause the operator to be in the center of the "ride zone" when seated. The operator then decides if he would like to be positioned higher or lower. If higher, he simply lifts the entire seat upper to move pawl 66 to a higher ratchet step 70'. If lower, he lifts the upper still further so as to cause the pawl to be locked out of contact with the ratchet steps by the spring finger 72 and retaining rod 74.

We claim as our invention:

1. In a resilient suspension system for a vehicle seat including a seat suspension base support, a vertically movable seat suspension upper support, a linkage system on each side of the seat which is connected to the seat suspension base support and to the seat suspension upper support for guiding and permitting generally vertical movement of the upper support relative to the base support, and spring means and damper means for yieldingly resisting upward and downward movement of the upper support, the improvement comprising adjustable mounting means on one of said supports attached to one portion of said spring means for permitting the tension of said spring means to be selectively varied to accommodate occupants of varying weights, means on said one of said supports for pivotally mounting at least one elongated bellcrank lever having a short leg portion and a long leg portion, means at the end of the short leg portion of said at least one elongated bellcrank lever for mounting a second portion of said spring means, cooperating cam and cam follower means, one of which is located on the long leg portion of said at least one elongated bellcrank lever and the other of which is located on the other of said supports for causing the means for mounting the second portion of the spring means to move relative to the means for mounting the first portion of the spring means as said supports move vertically toward or away from each other, said cam means being of a non-rectilinear configuration.

2. A resilient suspension in accordance with claim 1 wherein said adjustable mounting means is positioned on said upper support.

3. A resilient suspension in accordance with claim 1 wherein said cam is formed on an edge surface of said long leg portion, said cam follower means comprising a roller.

4. A resilient suspension in accordance with claim 1 wherein said cam follower means is mounted for selective vertical movement relative to said other support to a plurality of distinct positions for varying the mid-ride position of the suspension upper support relative to the suspension base support.

5. A resilient suspension in accordance with claim 4 wherein said cam follower comprises a roller which is mounted at one end of a height adjustment arm means which is pivoted at its other end to said base support.

6. A resilient suspension in accordance with claim 5 wherein said plurality of distinct positions are determined by a locking means comprising a movable spring biased pawl member carried by said height adjustment arm and a multiple toothed member attached to said base support.

7. A resilient suspension in accordance with claim 6 wherein a flexible connection member is attached to said upper support and to said height adjustment arm, said connection member serving to permit said height adjustment member to be lifted relative to said toothed member when a lifting force is applied to said upper support which tends to move it above the upper end of its ride zone.

8. A resilient suspension in accordance with claim 3 wherein said cam comprises a surface on said long leg portion of said bellcrank which is formed so that said bellcrank will produce a uniform rate of expansion of said spring means when said upper and base supports are moved at a uniform rate toward each other.

9. A resilient suspension in accordance with claim 5 wherein the bottom of the ride zone of the suspension is determined by at least one elastomeric pad member which is fixed relative to the upper support and is adapted to contact said height adjustment arm on its top surface at or near to its said one end.

10. A resilient suspension in accordance with claim 7 wherein said toothed member is in the form of a ratchet and includes a ramp surface extension on its uppermost tooth which causes said pawl member to be moved sufficiently far from said toothed member when said seat upper is lifted that a latching finger carried by the pawl member will be retained by a retaining element carried by said height adjustment arm until the height adjustment arm is lowered to a point just above its lowest position relative to the multiple toothed member, at which time a stop member carried by the base support will contact and release said latching finger.

* * * * *